(No Model.)
E. SCHENSON.
VALVE.
No. 261,959.  Patented Aug. 1, 1882.
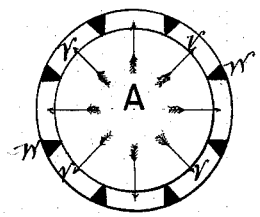
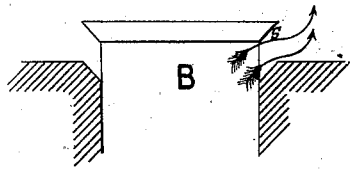
FIG. 1.   FIG. 3.   FIG. 5.
  
FIG. 2.   FIG. 4.   FIG. 6.
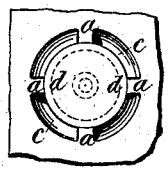 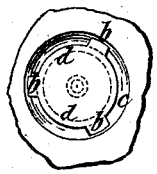 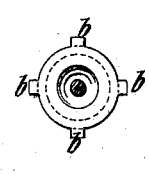
FIG. 7.   FIG. 9.   FIG. 11.
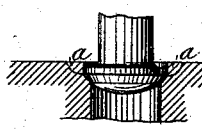 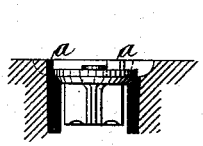 
FIG. 8.   FIG. 10.   FIG. 12.
Witnesses
Chas H Smith
Harold Serrell
Inventor
Elis Schenson
per Lemuel W. Serrell
atty
N. PETERS. Photo-Lithographer, Washington, D. C.

UNITED STATES PATENT OFFICE.

ELIS SCHENSON, OF UPSALA, SWEDEN, ASSIGNOR TO RICHARD SCHRAM, OF 9 NORTHUMBERLAND STREET, STRAND, LONDON, ENGLAND.

VALVE.

SPECIFICATION forming part of Letters Patent No. 261,959, dated August 1, 1882.

Application filed January 30, 1882. (No model.) Patented in England February 2, 1881, No. 449; in France May 10, 1881, and in Belgium May 12, 1881.

*To all whom it may concern:*

Be it known that I, ELIS SCHENSON, of Upsala, Sweden, have invented new and useful Improvements in Valves, (for which I have obtained a patent in Great Britain the 2d February, 1881, No. 449, in France the 10th May, 1881, and in Belgium the 12th May, 1881,) of which the following is a specification.

This invention, which is applicable to all lifting-valves without reference to their form or uses, has for its object the provision of simple means for effecting the avoidance of the well-known suction or sucking action which occurs in valves of the ordinary construction, the detrimental tendency or influence of which is to prevent the full and free lifting of the valve, and thus to impede the flow or passage of the escaping fluid. This suction is caused by the partial vacuum formed in the passing off of the escaping fluid in consequence of the outer aperture or periphery of the valve-seat being of a greater extension and area than the inner periphery thereof, and which difference renders the escaping fluid (let it, for example, be supposed to be water) unable to rise to the same height at the said outer and larger periphery of the valve-seat, where it is spread out over the larger area, as at the inner and smaller periphery, thus causing the said suction.

Referring to the accompanying sheet of drawings, I will first describe two diagrams marked respectively A and B, which will serve to illustrate the cause of the aforesaid sucking action.

Diagram A is a plan of a valve-seat, indicated by the annular space $v$, contained between the outer circle and the inner circle. Evidently the outer circle is somewhat larger in periphery than the inner, and if it be imagined that the stream of escaping fluid is divided in a vast number of minute parallel streams, escaping in radial directions, then a vast number of intermediate wedge-shaped spaces will be formed or left between each two such little parallel streams. Diagram A shows the escaping stream divided into eight parallel streams passing off all round in the direction of the arrows, and between each two such streams there is a wedge-shaped part, $w$. These parts $w$ constitute the differences between the available area for the efflux of the fluid at the inside of the valve-seat and from thence toward the outside of same. As the available area for efflux is thus increasing while the volume and speed of the escaping fluid remain the same, it is evident that a number of small vacuous spaces increasing in size or number toward the outside of the valve-seat are produced, and the partial vacuum thus momentarily created below the valve, added to the weight of the valve and to the down-pressure of the fluid column on the top of the valve, will cause the valve to drop partly down onto its seat and to drop wholly onto its seat before the time, thus limiting the volume of fluid that should theoretically flow out at each stroke of the pump or lift of the valve, and in safety-valves, for instance, producing the well-known tremor or trembling action, and reduction of lift to a mere fraction of the lift for which the valves are actually designed to work and by many ignorantly supposed to work.

Diagram B, which is a sectional elevation of a valve and valve-seat, will serve to further elucidate this sucking action, and rather from a different point of view. The valve is shown in its raised position, and the arrows indicate the flow of the fluid. The arrows approach each other very rapidly, as shown, and the space between the two arrows indicates the volume or stream of water escaping, but, for argument's sake, merely to illustrate the theory. The space $s$ between the valve-face and the upper arrow will then represent the place, space, and amount of vacuum formed under the valve, which vacuum or partial vacuum, together with the weight of the valve and the pressure of the fluid column on the top of the valve, produces the aforesaid sucking action.

The principle of this invention consists in avoiding this sucking action and its detrimental influence and increasing the efficiency of the valve by making the area of the said aperture—that is, the operative perimeter of the outer periphery of the valve-seat—for the escaping fluid equal to that of the inner periphery of the valve-seat, which equalization permits of the escaping fluid rising to the same height all over the valve-seat, and consequently allows of the valve rising easily and fully, and of an unimpeded escape to the fluid.

Such being the nature and object of the present invention, I will now proceed to describe more in detail the manner in which the same is to be or may be performed or carried into practical effect.

Figures 1, 3, 5, 7, 9, and 11 are vertical sections, and Figs. 2, 4, 6, 8, 10, and 12 are corresponding plan views, of valves and valve-seats of various conformations and as adapted with various modifications of the present improvements. These figures, 1 to 12, are illustrative of some of the most advantageous modifications of which the principle of the invention is susceptible, and comprise the application in various ways to or around the outer periphery of the valve or of its seat of one or more equalizing or stopping-up pieces, and which may also act as guides for the valve, the principal purpose and effect of their application, however, being to reduce the outer periphery or escape-aperture of the valve-seat, so as to make it equal in area to that of the inner periphery thereof, for the purpose hereinbefore stated, and to effect this the total width of the said equalizing or stopping-up pieces or guides is made equal to the difference in circumference between the inner and the outer peripheries of the valve-seat.

In Figs. 1 and 2, $d$ represents the inner periphery of the valve-seat, $c$ the outer periphery or escape-aperture thereof, and $a$ the equalizing or stopping-up pieces, which fit as guides close around the valve, and the total width of which is equal to the difference between the inner and the outer peripheries of the valve-seat, thus equalizing the area of escape at the inner and outer peripheries of and all over the valve-seat. These pieces $a$ correspond with the wedge-pieces $w$ in diagram A.

In Figs. 3 and 4 the equalizing or stopping-up pieces $b$ are shown as attached to the outer periphery of the valve itself and fitting close around the valve-seat, acting also as guides to the valve. Figs. 5 and 6 are illustrative of an application similar to the next preceding, but to a different form of valve. Figs. 7 and 8 are illustrative of the application of the equalizing-pieces to the outer periphery or escape-aperture of the valve-seating.

In adapting the present improvements to a valve made or fitted with guide-wings, as illustrated in Figs. 9 and 10, I make the equalizing-pieces $a$ of such a total width as will cause the outer aperture or periphery of the valve-seat to be equal to the inner periphery thereof minus the total width of the wings; but in adapting them to a valve made or fitted with guide-wings of the conformation delineated in Figs. 11 and 12 I take no account of the width of the said wings. When the valve moves between the guides or pieces $a$, as shown in Figs. 1 and 2, I prefer to make the valve-seat slightly incline inward; but when the equivalent guides or pieces $b$ are attached to the valve, as shown in Figs. 3 to 6, I prefer to make it incline outward.

I would here remark that although I prefer to make the total width of the stopping-pieces or guides equal to the difference between the inner and the outer peripheries of the valve-seat, in order to attain the full advantages arising from the application of the present improvements, yet I do not limit myself thereto, as, according to obvious modifications of the present improvements, any small reduction tending to equalize the said peripheries will correspondingly improve the working of the valve in relation to its usual working.

The equalizing-pieces may be single or separate parts; or they may be projections from a connecting ring or piece; and they may, either singly or in this connected or in any equivalent way, be secured to the valve or to its seat, or to the valve-box or other surroundings of either, wherever so applicable; or they may be formed therewith of the same metal; or they may be otherwise formed of any suitable metal or material such as is usually used in the manufacture of the valve or of its seating. The present application does not profess to particularly describe all the particular means which may be employed for carrying the invention into effect, but describes some suitable means directly applicable to the valve or to its seat, which means have the effect and action hereinbefore clearly set forth.

Having now particularly described and ascertained the nature and object of the said invention, together with the manner in which the same is to be or may be performed or carried into practical effect, I would remark in conclusion that I claim—

The combination, with a lift-valve and its seat, of equalizing or stopping-up pieces around the valve, substantially as set forth, whereby the area of the outer fluid-escape aperture is reduced and made substantially equal to the area of the inner fluid-escape aperture, for the purposes specified.

ELIS SCHENSON.

Witnesses:
  E. G. BREWER,
  E. W. ECAILLE,
    *Both of 33 Chancery Lane, W. C.*